(12) United States Patent
Hodgins et al.

(10) Patent No.: US 10,328,661 B2
(45) Date of Patent: *Jun. 25, 2019

(54) LOW GLOSS, AIR PERMEABLE, ABRASION RESISTANT, PRINTABLE LAMINATE CONTAINING AN ASYMMETRIC MEMBRANE AND ARTICLES MADE THEREFROM

(71) Applicant: W. L. Gore & Associates, Inc., Newark, DE (US)

(72) Inventors: Michael E. Hodgins, Lincoln University, PA (US); Justin J. Skaife, Earleville, MD (US); David J. Luber, Landenberg, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/401,370

(22) Filed: Jan. 9, 2017

(65) Prior Publication Data
US 2017/0113433 A1    Apr. 27, 2017

Related U.S. Application Data

(63) Continuation of application No. 13/830,906, filed on Mar. 14, 2013, now Pat. No. 9,573,339.
(Continued)

(51) Int. Cl.
*B32B 3/26*        (2006.01)
*B32B 27/12*       (2006.01)
(Continued)

(52) U.S. Cl.
CPC ............. *B32B 3/26* (2013.01); *B32B 5/16* (2013.01); *B32B 5/18* (2013.01); *B32B 5/22* (2013.01);
(Continued)

(58) Field of Classification Search
CPC .... B32B 5/18; B32B 5/24; B32B 5/32; B32B 7/14; B32B 27/02; B32B 27/12;
(Continued)

(56) References Cited

U.S. PATENT DOCUMENTS 4,277,429 A    7/1981    Okita
4,385,093 A    5/1983    Hubis
(Continued)

FOREIGN PATENT DOCUMENTS

JP    2010-180525    8/2010
KR    10-2012-0101287    9/2012
(Continued)

*Primary Examiner* — Jeremy R Pierce
(74) *Attorney, Agent, or Firm* — Greenberg Traurig, LLP

(57) ABSTRACT

Asymmetric expanded polytetrafluoroethylene (ePTFE) membranes that contain multiple layers of ePTFE where at least one layer of ePTFE has a microstructure different from the microstructure of a second ePTFE layer. In exemplary embodiments, the asymmetric membrane contains a first ePTFE layer that has an "open" microstructure and a second ePTFE layer that has a less open, or "tight" microstructure. A third ePTFE layer having an "open" microstructure may be positioned on the second ePTFE layer. The asymmetric membranes possess print durability and are both abrasion resistant and air permeable. Additionally, printed asymmetric ePTFE membranes demonstrate low gloss. A textile may be affixed to the asymmetric membrane such that the first ePTFE layer is the outer surface of the laminate. Laminates containing the asymmetric membrane are sufficiently durable against abrasion so that articles of apparel having an exterior film surface remain liquid proof after an abrasion challenge.

10 Claims, 8 Drawing Sheets

Related U.S. Application Data

(60) Provisional application No. 61/754,336, filed on Jan. 18, 2013.

(51) Int. Cl.
  *B32B 27/32* (2006.01)
  *B32B 5/16* (2006.01)
  *B32B 5/30* (2006.01)
  *B32B 7/02* (2019.01)
  *B32B 5/18* (2006.01)
  *B32B 5/22* (2006.01)
  *B32B 5/32* (2006.01)

(52) U.S. Cl.
  CPC .............. *B32B 5/30* (2013.01); *B32B 5/32* (2013.01); *B32B 7/02* (2013.01); *B32B 27/12* (2013.01); *B32B 27/32* (2013.01); *B32B 27/322* (2013.01); *B32B 2250/00* (2013.01); *B32B 2250/03* (2013.01); *B32B 2250/04* (2013.01); *B32B 2250/24* (2013.01); *B32B 2307/402* (2013.01); *B32B 2307/408* (2013.01); *B32B 2307/4023* (2013.01); *B32B 2307/554* (2013.01); *B32B 2307/70* (2013.01); *B32B 2307/718* (2013.01); *B32B 2307/724* (2013.01); *B32B 2307/7265* (2013.01); *B32B 2307/73* (2013.01); *B32B 2307/75* (2013.01); *B32B 2437/00* (2013.01); *Y10T 428/2481* (2015.01); *Y10T 428/24802* (2015.01); *Y10T 428/24851* (2015.01)

(58) Field of Classification Search
  CPC ..... B32B 27/30; B32B 27/34; B32B 2327/18; A41D 31/0016; A41D 2400/22; Y10S 2/904
  See application file for complete search history.

(56) References Cited

U.S. PATENT DOCUMENTS

| | | |
|---|---|---|
| 4,863,604 A | 9/1989 | Lo et al. |
| 5,064,593 A | 11/1991 | Tamaru et al. |
| 5,154,827 A | 10/1992 | Ashelin et al. |
| 5,183,545 A | 2/1993 | Branca et al. |
| 5,217,666 A | 6/1993 | Tamaru et al. |
| 5,476,589 A | 12/1995 | Bacino et al. |
| 5,708,044 A | 1/1998 | Branca |
| 5,814,405 A | 9/1998 | Branca et al. |
| 5,885,738 A * | 3/1999 | Hannon .................. B41M 1/30 101/483 |
| 5,910,277 A | 8/1999 | Ishino et al. |
| 6,030,428 A | 2/2000 | Ishino et al. |
| 6,071,551 A | 6/2000 | Hoels |
| 6,214,093 B1 | 4/2001 | Nabata et al. |
| 6,235,377 B1 | 5/2001 | Dillon et al. |
| 6,541,589 B1 | 4/2003 | Baillie |
| 7,306,729 B2 | 12/2007 | Bacino et al. |
| 7,374,679 B2 | 5/2008 | Huang et al. |
| 7,531,611 B2 | 5/2009 | Sabol |
| 9,573,339 B2 * | 2/2017 | Hodgins .................. B32B 3/26 |
| 2005/0266228 A1 | 12/2005 | Jain et al. |
| 2010/0287680 A1* | 11/2010 | Johnson .................. A41D 31/02 2/87 |
| 2011/0271416 A1* | 11/2011 | Sturgill .............. A41D 31/0016 2/69 |

FOREIGN PATENT DOCUMENTS

| | | |
|---|---|---|
| WO | WO-99/08137 A1 | 2/1999 |
| WO | WO2001-041877 | 6/2001 |
| WO | WO 2010/132082 A1 | 11/2010 |
| WO | WO 2010/132083 A1 | 11/2010 |
| WO | WO 2011/140494 A1 | 11/2011 |

* cited by examiner

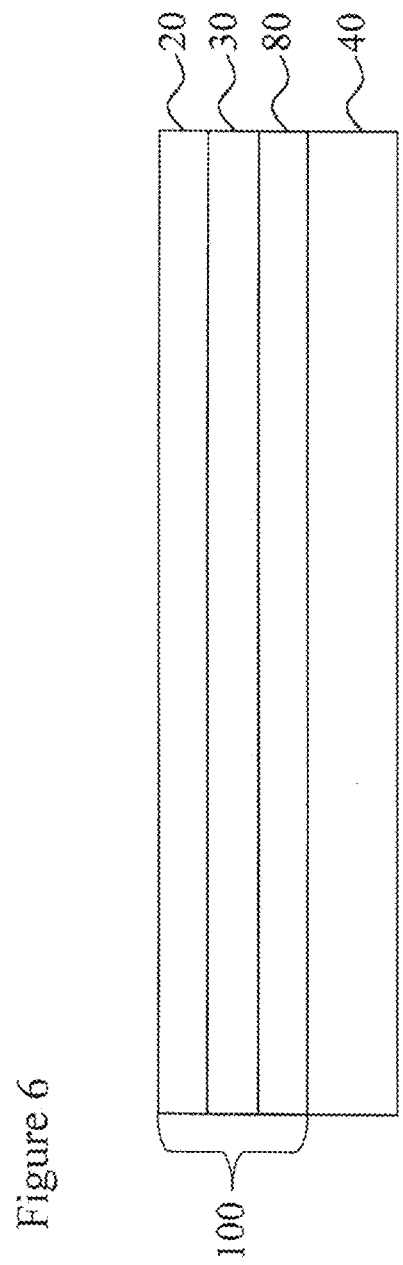

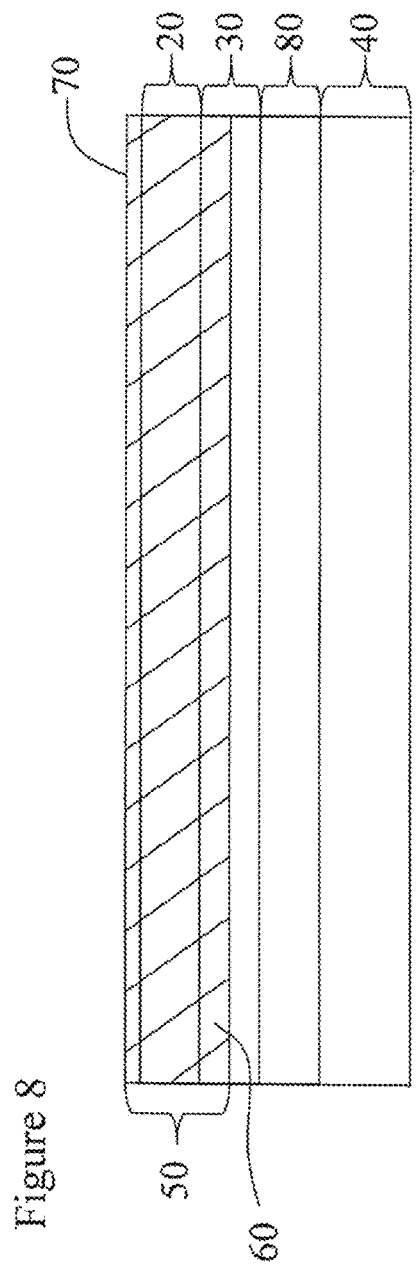

LOW GLOSS, AIR PERMEABLE, ABRASION RESISTANT, PRINTABLE LAMINATE CONTAINING AN ASYMMETRIC MEMBRANE AND ARTICLES MADE THEREFROM

CROSS-REFERENCE TO RELATED APPLICATION

This application is a continuation of application Ser. No. 13/830,906, filed Mar. 14, 2019, now U.S. Pat. No. 9,573,339.

FIELD OF THE INVENTION

The present invention relates generally to air permeable laminates, and more specifically to an air permeable, multilayer laminate that includes a membrane having an asymmetric structure that is durably printable, provides low gloss, and possesses liquidproofness and high abrasion resistance. Articles containing the air permeable, multilayer laminate are also provided.

BACKGROUND OF THE INVENTION

Laminates that contain a film layer to provide water resistance, liquidproofness, and/or breathability are well-known. Such laminates are used, for example, in the construction of garments, shoes, tents, covers, and bivy bags. Conventionally, the film layer is protected by fabric layers that provide protection to the film layer so that the film layer remains undamaged. The film layer is usually laminated to the fabrics in a way that maintains suitable breathability for the comfort of the end user. The fabric layers may be surface printed with a color or pattern to provide an aesthetically pleasing surface.

The addition of fabric layers required to protect film layers from damage adds undesirable weight to an article of apparel, and often results in materials that have a higher water pickup on the outer surface There exists a need in the art for a laminate that has an outer, abrasion-resistant surface that can be durably printed with a color or pattern to provide an aesthetically pleasing, low gloss surface, without sacrificing air permeability, and which can be used as an outer surface of a garment.

SUMMARY OF THE INVENTION

In one embodiment, the invention is a laminate comprising a hydrophobic asymmetric porous membrane comprising: a first expanded polytetrafluoroethylene membrane having a first microstructure and containing a plurality of pores having a first pore size; and a second expanded polytetrafluoroethylene membrane having second microstructure and containing a plurality of pores having a second pore size; and a textile layer positioned on the second expanded polytetrafluoroethylene membrane opposite the first expanded polytetrafluoroethylene membrane, wherein the first pore size is greater than the second pore size, wherein the first expanded polytetrafluoroethylene membrane has a printed area on the exterior surface, and wherein the laminate has a gloss of less than about 10 gloss units and a Gurley number of less than about 100 seconds. In an alternative embodiment, the laminate has a gloss of less than about 8 gloss units. In another embodiment, the laminate has a Gurley number of less than about 50 seconds. In an alternative embodiment, the laminate has a Gurley number of less than about 35 seconds. In an alternative embodiment, the laminate has a mass/area less than about 150 g/cm². In an alternative embodiment, the laminate has a mass/area less than about 80 g/m². In another embodiment of the invention, the laminate has a moisture vapor transmission rate greater than about 20000 g/m²/24 hours. In an alternative embodiment, the laminate has a moisture vapor transmission rate greater than about 25000 g/m²/24 hours. In an alternative embodiment, the laminate has a moisture vapor transmission rate greater than about 30000 g/m²/24 hours. In another embodiment, the laminate has a change in Gurley number after abrasion of less than −25%. In another embodiment of the invention, the printed area has a color consistency less than about 1.5 delta-E. In an alternate embodiment, the printed area has a color consistency less than about 1.0 delta-E. In an alternate embodiment, the printed area has a color consistency less than about 0.8 delta-E. In an alternate embodiment, the laminate is liquidproof after more than 1000 abrasion cycles on the first expanded polytetrafluoroethylene membrane. In an alternate embodiment, the laminate is liquidproof after more than 5,000 abrasion cycles on the first expanded polytetrafluoroethylene membrane. In an alternate embodiment, the laminate is liquidproof after more than 10,000 abrasion cycles on the first expanded polytetrafluoroethylene membrane. In an alternate embodiment, the printed area comprises ink and the ink, at least partially penetrates the second expanded polytetrafluoroethylene membrane. In an alternate embodiment, the laminate has an oil rating of at least about 5. In a further embodiment, the laminate has a colorfastness to light with a delta-E of less than about 2.

Another embodiment of the invention comprises a laminate comprising: a hydrophobic asymmetric porous membrane comprising: a first expanded polytetrafluoroethylene membrane having a first microstructure and containing a plurality of pores having a first pore size; and a second expanded polytetrafluoroethylene membrane having second microstructure and containing a plurality of pores having a second pore size; and a textile lager positioned on the second expanded polytetrafluoroethylene membrane opposite the first expanded polytetrafluoroethylene membrane, wherein the first pore size is greater than the second pore size, wherein the first expanded polytetrafluoroethylene membrane has a printed area on the exterior surface, and wherein the laminate has a color consistency of less than about 1.5 delta-E and a Gurley number of less than about 100 seconds.

Another embodiment of the invention comprises a laminate comprising: a hydrophobic asymmetric porous membrane comprising: a first expanded polytetrafluoroethylene membrane having a first microstructure and containing a plurality of pores having a first pore size; and a second expanded polytetrafluoroethylene membrane having second microstructure and containing a plurality of pores having a second pore size; and (2) a textile layer positioned on the second, expanded polytetrafluoroethylene membrane opposite the first expanded polytetrafluoroethylene membrane, wherein the first pore size is greater than the second pore size, wherein the first expanded polytetrafluoroethylene membrane has a printed area on the exterior surface, and wherein the laminate is liquidproof after more than about 5000 abrasion cycles on the first expanded polytetrafluoroethylene membrane, and has a Gurley number of less than about 100 seconds.

In a further embodiment, a laminate of the invention may further comprise a third expanded polytetrafluoroethylene membrane having a third microstructure positioned on the second membrane such that the second membrane is sandwiched between the first membrane and the third membrane.

In another embodiment, the third microstructure is substantially the same as the first microstructure. In another embodiment, the third membrane contains a plurality of pores having a third pore size that is greater than the second pore size, and wherein the first microstructure is different from the third microstructure.

In another embodiment, the invention comprises a laminate comprising: a hydrophobic asymmetric porous membrane comprising: a first expanded polytetrafluoroethylene membrane having a first microstructure and containing a plurality of pores having a first pore size; a second expanded polytetrafluoroethylene membrane having second microstructure and containing a plurality of pores having a second pore size; and a third expanded polytetrafluoroethylene membrane having a third microstructure and containing a plurality of pores having a third pore size, the third membrane being positioned on the second membrane such that the second membrane is sandwiched between the first membrane and the third membrane; and (2) a textile layer positioned on the third expanded polytetrafluoroethylene membrane opposite the second expanded polytetrafluoroethylene membrane, wherein each of the first pore size and the third pore size is greater than the second pore size, wherein at least the first expanded polytetrafluoroethylene membrane has a printed area an exterior surface thereof, and wherein the printed area has a gloss less than 10 gloss units.

Another embodiment of the invention comprises a hydrophobic asymmetric porous membrane comprising: a first expanded polytetrafluoroethylene membrane having a first microstructure and containing a plurality of pores having a first pore size; and a second expanded polytetrafluoroethylene membrane having second microstructure and containing a plurality of pores having a second pore size, wherein the first pore size is greater than the second pore size, wherein at least one of the first expanded polytetrafluoroethylene membrane and the second expanded polytetrafluoroethylene has printed area on exterior surface thereof, and wherein the printed area comprises ink and the ink at least partially penetrates the second membrane. In an alternative embodiment, an asymmetric porous membrane further comprises a third expanded polytetrafluoroethylene membrane having a third microstructure positioned on the second membrane such that the second membrane is sandwiched between the first membrane and the third membrane. In an alternative embodiment, a third microstructure is substantially the same as the first microstructure. In an alternative embodiment, the third membrane contains a plurality of pores having a third pore size that is greater than the second pore size, and wherein the first microstructure is different from the second microstructure. In an alternative embodiment, an asymmetric membrane has an oil rating greater than about 5. In an alternative embodiment, an asymmetric membrane has a moisture vapor transmission rate greater than about 60000 g/m$^2$/24 hours.

In an alternative embodiment, an asymmetric membrane may exhibit a gloss of less than about 10 gloss units and a Gurley number of less than about 100 seconds, in an alternative embodiment, an asymmetric membrane has a gloss of less than about 8 gloss units. In another embodiment, an asymmetric membrane has a Gurley number of less than about 50 seconds, in an alternative embodiment, an asymmetric membrane has a Gurley number of less than about 35 seconds. In an alternative embodiment, an asymmetric membrane has a mass/area less than about 150 g/m$^2$.

In an alternative embodiment, an asymmetric membrane has a mass/area less than about 80 g/m$^2$. In another embodiment of the invention, an asymmetric membrane has a moisture vapor transmission rate greater than about 20000 g/m$^2$/24 hours. In an alternative embodiment, an asymmetric membrane has a moisture vapor transmission rate greater than about 25000 g/m$^2$/24 hours. In an alternative embodiment, an asymmetric membrane has a moisture vapor transmission rate greater than about 30000 g/m$^2$/24 hours. In another embodiment, an asymmetric membrane has a change in Gurley number after abrasion of less than −25%. In another embodiment of the invention, the printed area has a color consistency less than about 1.5 delta-E. In an alternate embodiment, the printed area has a color consistency less than about 1.0 delta-E. In an alternate embodiment, the printed area has a color consistency less than about 0.8 delta-E. In an alternate embodiment, an asymmetric membrane is liquidproof after more than 1000 abrasion cycles on the first expanded polytetrafluoroethylene membrane. In an alternate embodiment, an asymmetric membrane is liquidproof after more than 5,000 abrasion cycles on the first expanded polytetrafluoroethylene membrane. In an alternate embodiment, an asymmetric membrane is liquidproof after more than 10,000 abrasion cycles on the first expanded polytetrafluoroethylene membrane. In an alternate embodiment, the printed area comprises ink and the ink at least partially penetrates the second expanded polytetrafluoroethylene membrane. In an alternate embodiment, an asymmetric membrane has an oil rating of at least about 5 In a further embodiment, an asymmetric membrane has a colorfastness to light with a delta-E of less than about 2.

It would be appreciated by one of skill in the art that multiple combinations of the embodiments described herein are within the scope of the present invention.

BRIEF DESCRIPTIONS OF FIGURES

The advantages of this invention will be apparent upon consideration of the following detailed disclosure of the invention, especially when taken in conjunction with the accompanying drawings wherein:

FIG. 6 is a schematic illustration of a textile laminate including the three-layer asymmetric ePTFE membrane of FIG. 5 according to one exemplary embodiment of the invention;

FIG. 8 is a schematic illustration depicting the partial penetration of ink into the second ePTFE layer of a textile laminate having a three-layer asymmetric membrane according to at least one exemplary embodiment of the invention.

DETAILED DESCRIPTION OF THE INVENTION

Figure 1:
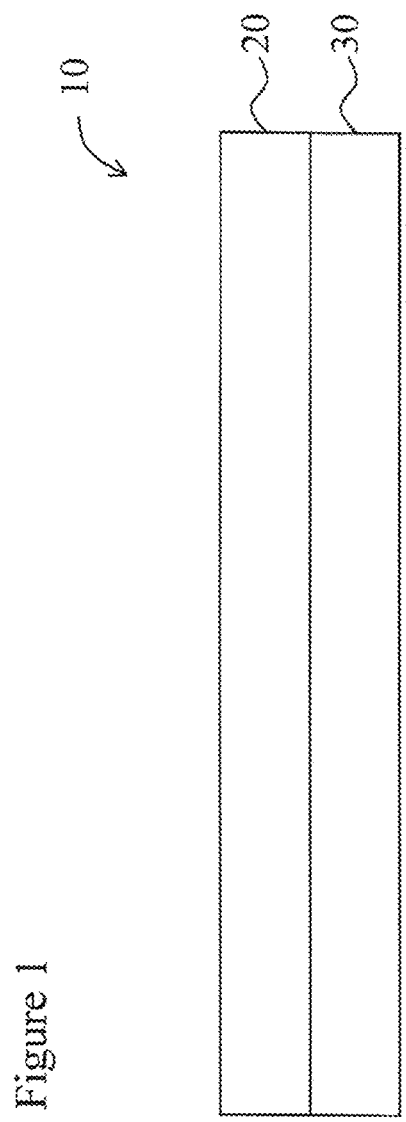
FIG. 1 is a schematic illustration of a two-layer asymmetric ePTFE membrane according to one exemplary embodiment of the invention.

The present invention provides a water resistant, liquid-proof and breathable laminate that has an outer, abrasion-resistant surface that exhibits low water pick up and can be durably printed with a color or pattern to provide an aesthetically pleasing, low gloss surface. This novel laminate provides these attributes without sacrificing air permeability and can be used as an outer surface of a garment.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein.

In the drawings, the thickness of the lines, layers, and regions may be exaggerated for clarity. It will be understood that when an element such as a layer, region, substrate, or panel is referred to as being on another element, it can be directly on the other element or intervening elements may also be present. Also, when an element is referred to as being "adjacent" to another element, the element may be directly adjacent to the other element or intervening elements may be present. It is to be noted that like numbers found throughout the figures denote like elements.

The invention relates to asymmetric expanded polytetrafluoroethylene (ePTFE) membranes that possess print durability, are abrasion resistant, and are air permeable. In addition, printed asymmetric ePTFE membranes according to the invention demonstrate low gloss. "Print durability" as used within this application is meant to indicate that the membrane retains or substantially retains the printed color when subjected to abrasion wear. As used herein, "asymmetric" is meant to indicate that the membrane structure includes multiple layers of ePTFE where at least one layer of ePTFE has a microstructure that is different from the microstructure of a second layer of ePTFE. For example, a multilayer ePTFE membrane may comprise multiple regions through the thickness of the structure having different microstructures where at least two of the membrane layers have a different microstructure.

It is to be appreciated that reference is made herein with respect to expanded polytetrafluorethylene (ePTFE) for ease of discussion. However, it is to be understood that any suitable expanded fluoropolymer membrane may be used interchangeably with any ePTFE layer described within this application. Non-limiting examples of expandable fluoropolymers include, but are not limited to, expanded PTFE, expanded modified PTFE, expanded copolymers of PTFE, fluorinated ethylene propylene (FEP), and perfluoroalkoxy copolymer resin (PFA). Patents have been filed on expandable blends of PTFE, expandable modified PTFE, and expanded copolymers of PTFE, such as, but not limited to, U.S. Pat. No. 5,708,044 to Branca; U.S. Pat. No. 6,541,589 to Baillie; U.S. Pat. No. 7,531,611 to Sabol et al.; U.S. patent application Ser. No. 11/906,877 to Ford, and U.S. patent application Ser. No. 12/410,050 to Xu et al. Porous membranes including polymeric materials such as polyolefins (e.g., polypropylene and polyethylene), polyurethanes, and polyesters are considered to be within the purview of the invention provided that the polymeric material can be processed to form porous or microporous membrane structures.

Reference is made to FIG. 1 which illustrates a two-layer asymmetric ePTFE membrane 10. The two-layer membrane 10 contains a first ePTFE layer 20 having a first microstructure and a second ePTFE layer 30 having a second microstructure. The microstructure of ePTFE is characterized by nodes interconnected by fibrils. The difference between the first microstructure and the second microstructure may be caused by, for example, a difference in pore size, a difference in node and/or fibril geometry or size, and/or a difference in density. Notwithstanding the mechanism utilized to achieve different microstructures achieved within the asymmetric membrane 10, the first ePTFE membrane 10 possesses a microstructure that is more "open" than the second microstructure of the second ePTFE layer 30. In the embodiment depicted in FIG. 1, the first ePTFE layer 20 is considered to have an "open" microstructure and the second ePTFE layer 30 is considered herein to have a "tight" microstructure. The first ePTFE layer 20 forms the outer surface of the final product. As used herein, the term "open" as opposed to "tight" means that the pore size of the "open" microstructure is larger than that of the "tight" microstructure as evidenced by bubble point or any suitable means for characterizing pore size, such as by the average fibril lengths. It is to be appreciated that a larger average fibril length indicates a more "open" microstructure (i.e., larger pore size) and a lower bubble point. Conversely, a shorter fibril length indicates a more "tight" microstructure (i.e., a smaller pore size) and a higher bubble point.

Figure 2C:
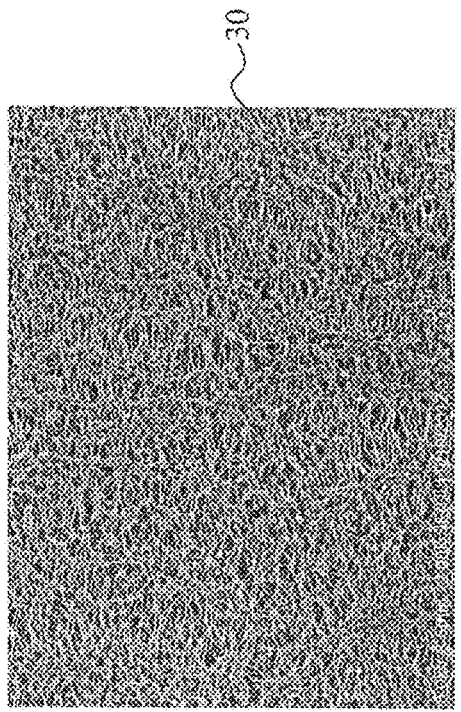
FIG. 2c is a scanning electron micrograph of the surface of the second ePTFE layer of FIG. 2a taken at 2000× magnification.
Figure 2B:
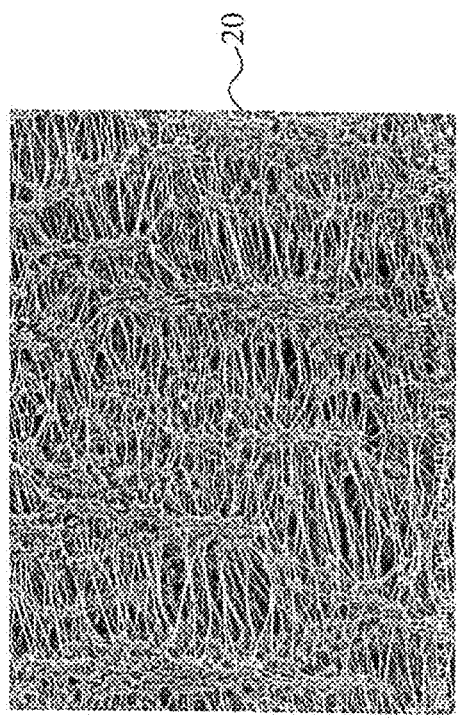
FIG. 2b is a scanning electron micrograph of the surface of the first ePTFE layer of FIG. 2a taken at 2000× magnification.
Figure 2A:
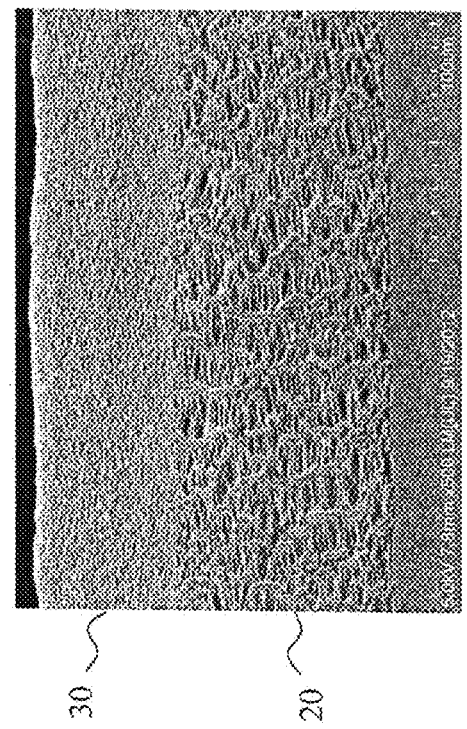
FIG. 2a is a cross section scanning electron micrograph (SEM) of an exemplary two-layer asymmetric ePTFE membrane taken at 500× magnification according to an exemplary embodiment of the invention.

The asymmetric structure of the ePTFE membrane 10 may be observable by scanning electron microscopy. For example, a two-layer asymmetric ePTFE membrane may be identified by a cross-sectional scanning electron micrograph (SEM) or by grey scale analysis of a cross-sectional SEM. FIG. 2a is a cross-sectional SEM of a two-layer asymmetric ePTFE membrane taken at 500× magnification. FIG. 2a clearly depicts the first ePTFE layer 20 having an open microstructure and the second ePTFE layer 30 having a tight microstructure. FIG. 2b is a scanning electron micrograph of the surface of the first ePTFE layer 20 taken at 2000× magnification and FIG. 2c is a scanning electron micrograph of the surface of the second ePTFE layer 30 taken at 2000× magnification.

Treatments may be provided to impart one or more desired functionality, such as, but not limited to, oleophobicity. When provided with an oleophobic coating, such as, but not limited to, a fluoroacrylate olephobic coating, the first ePTFE layer 20 of the asymmetric ePTFE membrane has an oil rating greater than 4, greater than 5, or greater than or equal to 6 when tested according to the Oil Rating Test described herein.

Figure 3:
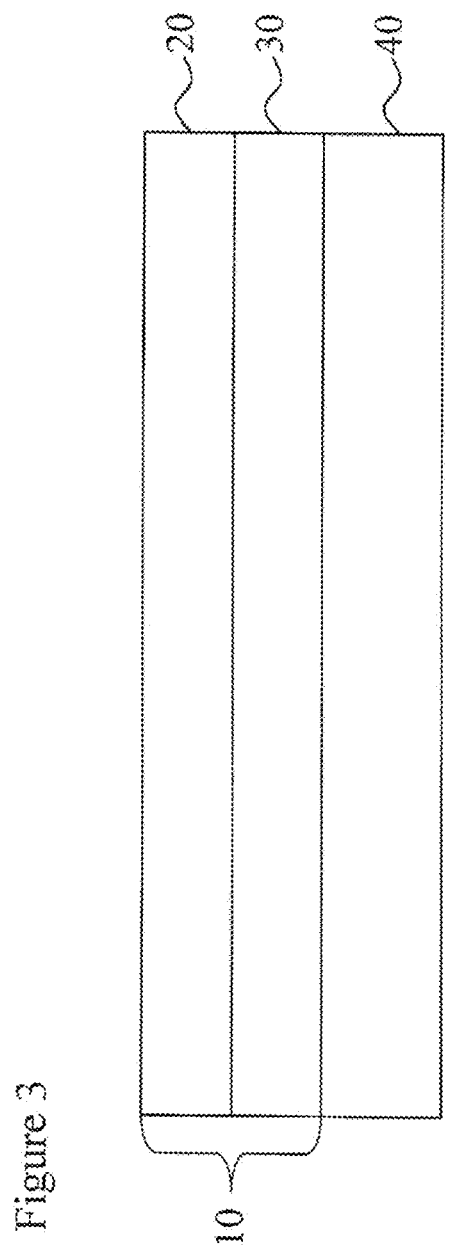
FIG. 3 is a schematic illustration of a textile laminate including the two-layer asymmetric ePTFE membrane of FIG. 1 according to one exemplary embodiment of the invention.

A textile layer 40 may be attached to the second ePTFE layer 30 of the asymmetric membrane 10 as shown in FIG. 3. The textile layer 40 may be formed of a woven, knit, or non-woven material, and it may be comprised of materials such as, but not limited to cotton, rayon, nylon, polyester, and blends thereof. The weight of the textile forming the textile layer 40 is not particularly limited except as required by the application. In exemplary embodiments, the textile is air permeable.

Any suitable process for joining the asymmetric ePTFE membrane 10 and the textile layer 40 may be used, such as gravure lamination, fusion bonding, spray adhesive bonding, and the like. The adhesive may be applied discontinuously or continuously, provided that breathability through the asymmetric membrane 10 is maintained. For example, the adhesive may be applied in the form of discontinuous attachments, such as by discrete dots, or in the form of an adhesive web to adhere layers of the asymmetric membrane 10 together.

The first ePTFE layer 20 of the asymmetric ePTFE membrane 10 has a microstructure where the pores of the ePTFE membrane are sufficiently open to provide properties such as moisture vapor transmission, air permeability, and penetration by coatings of colorants and oleophobic compositions. The second ePTFE layer 30 of the asymmetric ePTFE membrane 10 has a microstructure where the pores of the ePTFE membrane are sufficiently tight so as to provide water leakage resistance, and liquidproofness. Therefore the asymmetric ePTFE membrane 10 has a microstructure that is liquidproof, yet is sufficiently open on the surface to permit penetration by coatings of colorants and oleophobic compositions in a way that renders the asymmetric ePTFE membrane 10 material highly air permeable and breathable.

Colorant coating compositions include a pigment having a particle size sufficiently small to fit within the pores of the porous substrate. Pigment particles having a mean diameter of less than about 250 nm are useful for forming durable color. Additionally, coating compositions for use in the invention typically further include a binder that is capable of wetting the ePTFE substrate and binding the pigment to the pore walls. Multiple colors may be applied using multiple pigments, or by varying the concentrations of one or more pigments, or by a combination of these techniques. Additionally, the coating composition may be applied in the form of a solid, pattern, or print.

A coating composition can be applied to the first ePTFE layer 20 by conventional printing methods. Application methods for colorizing include but are not limited to, transfer coating, screen printing, gravure printing, ink-jet printing, and knife coating. Additional topical treatments can be applied to the porous membrane, provided sufficient porosity throughout the asymmetric ePTFE membrane 10 is maintained to retain moisture vapor transmission.

The first ePTFE layer 20 has a surface that, when printed, provides a durable printed surface. Although not wishing to be bound by theory, it is believed that the print durability of the asymmetric ePTFE laminates is due, at least in part, to the ability of the pigment and binder within the coating composition to pass through the first ePTFE layer 20 and at least partially penetrate into the second ePTFE layer 30. It is believed that the tight microstructure of the second ePTFE layer 30 helps to draw pigment and binder through microstructure of the first ePTFE layer 20 due to capillary forces present within the second ePTFE layer 30. More specifically, because the capillary forces in the second ePTFE layer 30 are greater than the capillary forces in the first ePTFE layer 20, pigment and binder are drawn from the surface of the first ePTFE layer 20 and into the microstructure of the second ePTFE layer 30.

The print durability of the asymmetric ePTFE membrane 10 is surprising as it is counterintuitive to think that an open microstructure would improve printability and create a printed surface that has a low gloss. In trying to solve the problem with a single layer, one of skill in the art would be inclined to tighten the structure. Instead, a multilayer membrane was created with an open, outer microstructure that surprisingly improved printability and reduced gloss, both of which are highly desirable features in a fabric or garment application.

The porosity of the first ePTFE layer 20 allows the particles within the coating composition to penetrate into the pores and not just sit on the surface. Preferably, the outer surface of the first ePTFE layer 20 is rough (uneven topography) so that when the pigment and binder fully absorbs into the first ePTFE layer 20, the resulting printed surface has a lower gloss. The rough microstructure surface of the asymmetric ePTFE membrane 10 produces a printed surface with low gloss (e.g., less than about 10 gloss units, and alternatively less than about 8 gloss units).

Figure 4:
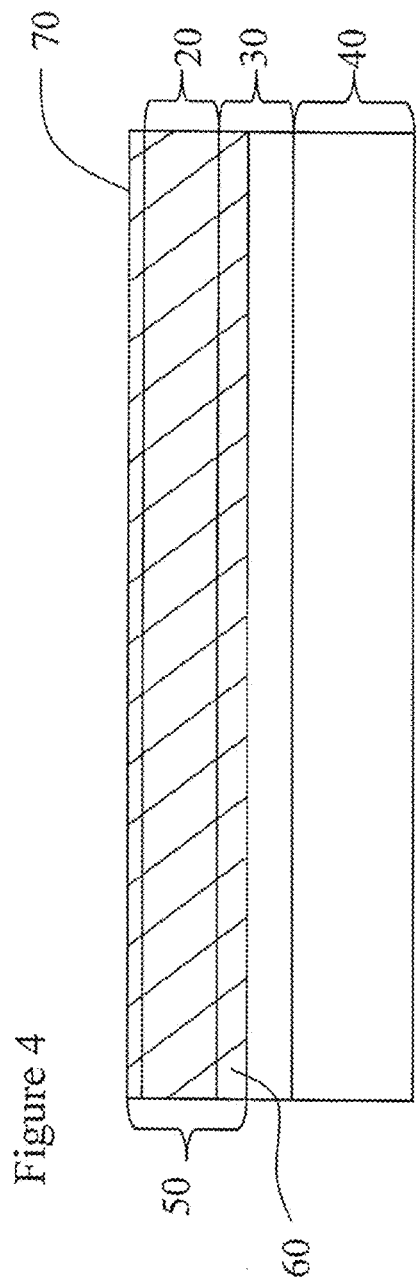
FIG. 4 is a schematic illustration depicting the partial penetration of ink into the second ePTFE layer of a textile laminate including a two-layer asymmetric ePTFE membrane according to at least one exemplary embodiment of the invention.

FIG. 4 pictorially shows the partial penetration of the ink into the second ePTFE layer 30. As depicted in FIG. 4, the ink layer 50 penetrates completely through the first ePTFE layer 20 and partially penetrates the second ePTFE layer 30. Penetration layer 60 illustrates the penetration of the ink layer 50 into the second ePTFE layer 30. It is to be understood that the depiction of the penetration layer 60 is for illustrative purposes only and that the ink can penetrate more or less into the second ePTFE layer 30 than what is shown in FIG. 4. The presence of ink in the ePTFE layers can be seen in an optical micrograph.

The partial penetration layer 60 helps to bind the ink and provide a durable surface whereby the ink is not easily removed. The print durability can be demonstrated by a scotch tape test where a piece of scotch tape is placed on the printed surface 70 and rubbed with a finger several times to solidly adhere the tape to the surface 70. The scotch tape is then peeled away from the surface 70 and the tape is observed to determine if there is any ink on the tape. The surface 70 of the membrane 10 is also observed to determine if the color has faded or otherwise been deteriorated by the removal of the tape. It is to be noted that the inventive laminates described herein did not demonstrate a deterioration or significant removal of color as a result of the scotch tape test.

It is to be appreciated that even after printing with a coating composition, the outer membrane surface of the printed laminates maintains an oil rating greater than 5, or greater than or equal to 6 when tested according to the Oil Rating Test described herein.

Figure 5:
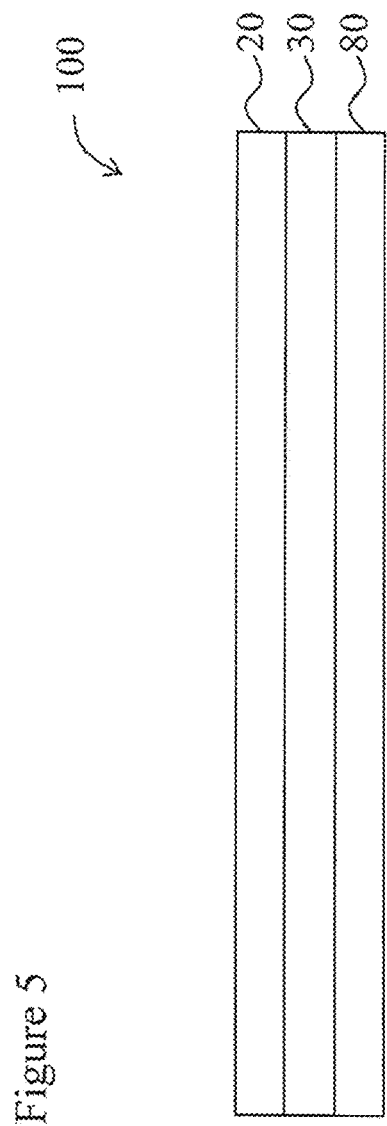
FIG. 5 is schematic illustration of a three-layer asymmetric membrane according to another exemplary embodiment of the invention.

In another exemplary embodiment, the asymmetric ePTFE membrane has at least three membrane layers, two of the ePTFE layers may have the same "open" microstructure, provided at least one ePTFE layer has a different, "tight" microstructure. Such an asymmetric ePTFE membrane is depicted generally in FIG. 5. The asymmetric ePTFE membrane 100 contains a first ePTFE layer 20 that has an "open" microstructure and a second ePTFE layer that has a less open, or "tight", microstructure as described above with reference to FIGS. 1-4. A third ePTFE layer 80 is provided on the second ePTFE layer 30 on the side opposing the first ePTFE layer 20 such that the second ePTFE layer 20 is centrally located within the membrane 100. The third ePTFE membrane 80 may have a microstructure that is substantially the same, as, or even identical to, the first ePTFE layer 20. Alternatively, the third ePTFE layer 80 may have a microstructure that is different from either the first ePTFE layer 20 or the second ePTFE layer provided that the microstructure of the third ePTFE layer 80 is more "open" than the second ePTFE layer 30. The asymmetric membrane 100 may have a textile layer 40 adhered to the third ePTFE layer as shown in FIG. 6. The textile layer 40 may be attached to the asymmetric membrane 100 by any suitable adhesive means, including those described above.

Figure 7B:
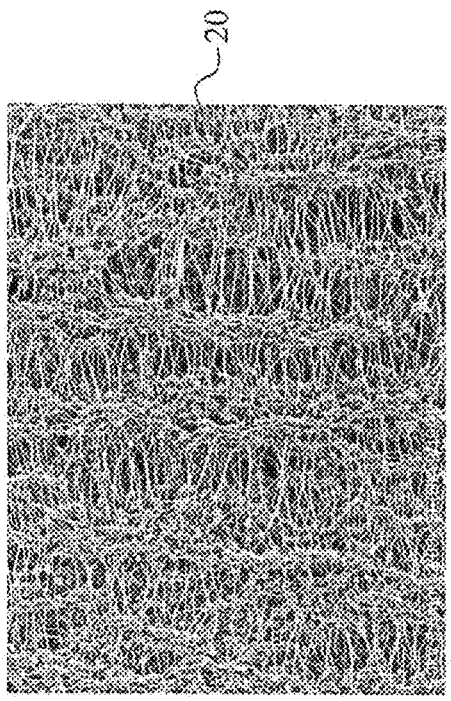
FIG. 7b is a scanning electron micrograph of the surface of the first ePTFE layer of FIG. 7a taken at 2000× magnification.
Figure 7C:
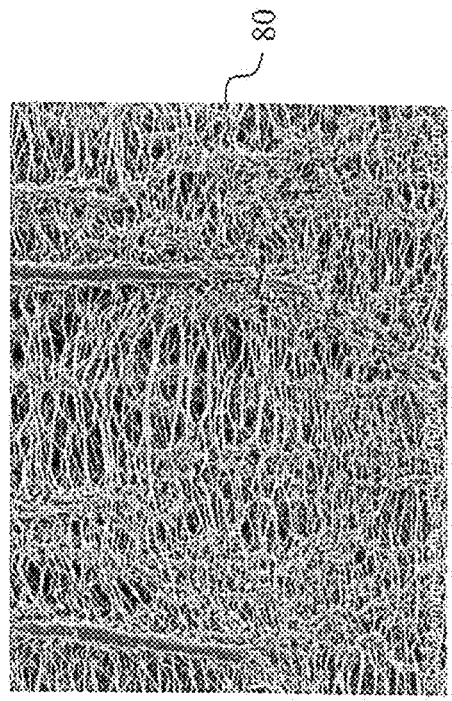
FIG. 7c is a scanning electron micrograph of the surface of the third ePTFE layer of FIG. 7a taken at 2000× magnification.
Figure 7A:
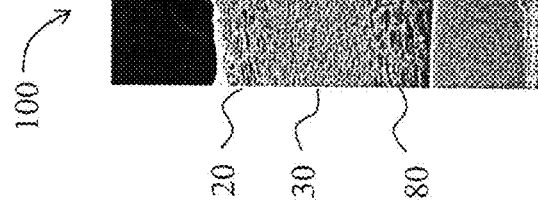
FIG. 7a is a cross section scanning electron micrograph (SEM) of an exemplary three-layer asymmetric ePTFE membrane taken at 500× magnification according to an exemplary embodiment of the invention.

The three-layer asymmetric ePTFE membrane is shown in FIG. 7a, which is a cross-sectional SEM of the three-layer asymmetric ePTFE membrane taken at 500× magnification. The three-layer asymmetric membrane structure is easily seen in FIG. 2a, where the first and third ePTFE layers 20, 80, respectively, have an open microstructure and the second ePTFE layer 30 has a tight (or less open) microstructure FIGS. 7b and 7c, respectively, show the first ePTFE layer 20 and the third ePTFE layer 80. FIG. 7b is a scanning electron micrograph of the surface of the first ePTFE layer 20 taken at 2000× magnification and FIG. 7c is a scanning electron micrograph of the surface of the third ePTFE layer 80 taken at 2000× magnification.

As with the two-layer asymmetric membrane 10 described above, pigment and binder (ink) penetrate the first ePTFE layer 20 and into the second ePTFE layer 30, as is schematically depicted in FIG. 8. It is believed that the mechanisms described above with respect to penetrating the second ePTFE layer 30 with binder and pigment similarly apply to the three-layer membrane 100. In at least one embodiment, the pigment and binder do not penetrate into the third ePTFE layer 80. However, it is conceivable that with sufficient ink volume and pressure during printing that both binder and pigment may enter into the third ePTFE layer 80. The presence of ink in the first and second ePTFE layers can be seen in an optical micrograph.

The two-layer asymmetric membrane 10 and three-layer asymmetric membrane 100 also possess sufficient mechanical strength to be used as the outer layer of a final article, such as a garment, tent, bivy bag, and the like. The presence of multiple ePTFE layers in the membranes 10, 100 both a longitudinal MTS and a Transverse MTS that is greater than that of a single-layered membrane with a microstructure that provides low gloss.

Printed laminates containing the above-described asymmetric membranes demonstrate color consistency (or low color change) when tested by the Color Consistency test described herein. Such color consistency indicates good pigment penetration, uniform wetting, and no filtering or pooling of the ink (pigment and binder). The inventive laminates may have a Color Consistency (as defined later herein) of less than 1.5 delta-E, less than 1.0 delta-E, or less than about 0.8 delta-E.

Additionally, the laminates have a Gurley Number when tested in accordance with the Gurley Air Flow test described herein of less than 100 seconds, less than 50 seconds, and less than about 35 seconds. The laminates also demonstrate a change in Gurley number after abrasion as described by the Gurley Change After Abrasion test described herein is less than about −60%, less than about −50%, less than about −25%, less than about 10%, or less than about 5%.

In addition, laminates described herein containing a multilayer asymmetric membrane have an outer film surface having a low water pickup compared to comparable laminates containing a single layer membrane. For example, laminates described herein have a water pickup less than about 10 $g/m^2$, less than or equal to about 8 $g/m^2$, less than or equal to about 6 $g/m^2$, or less than or equal to about 4 $g/m^2$.

Fabric laminates described herein are breathable and have a moisture vapor transmission rate (MVTR) that is greater than about 1000 $g/m^2/24$ hours, greater than about 5000 $g/m^2/24$ hours, greater than about 10000 $g/m^2/24$ hours, greater than about 15000 $g/m^2/24$ hours, greater than about 20000 $g/m^2/24$ hours, greater than about 25000 $g/m^2/24$ hours, or greater than about 30000 $g/m^2/24$ hours when tested according to the MVTR Test Method described herein. The laminates are also lightweight, and may have a mass/area less than about 150 $g/m^2$, less than about 100 $g/m^2$, less than about 80 $g/m^2$, less than about 70 $g/m^2$, or less than about 65 $g/m^2$.

The laminates do not leak after abrasion testing on the outer film surface of the laminate for greater than or equal to about 1000 abrasion cycles when tested according to the Martindale Abrasion to Leakage Test described herein. In other embodiments laminates are formed that remain liquidproof after 3000 abrasion cycles on the outer film surface, remain liquidproof after more than 5000 abrasion cycles on the outer film surface, or remain liquidproof after more than 10000 abrasion cycles on the outer film surface.

The asymmetric, multilayer laminates described herein is suitable for use in various applications, including but not limited to garments, tents, covers, bivy bags, and the like. Additionally, the laminates are sufficiently durable against abrasion so that articles of apparel that have an exterior film surface can be fabricated so that they remain liquidproof after an abrasion challenge. The lightweight laminate has a porous polymer surface that can be colorized with low gloss, for example, by printing. Further, the laminate outer film surface can be coated with an oleophobic coating composition to provide oleophobicity. Also, even after treating with an oleophobic coating and coloring the asymmetric laminates, the laminates retain air permeability which is important for comfort in the field of use.

Test Methods

It should be understood that although certain methods and equipment are described below, any method or equipment determined suitable by one of ordinary skill in the art may be alternatively utilized.

Thickness

Thickness was measured by placing the membrane or textile laminate between the two plates of a Mitutoyo 543-252BS Snap Gauge. The average of the three measurements was used.

Matrix Tensile Strength (MTS)

Matrix Tensile Strength was measured using an INSTRON 1122 tensile test machine equipped with flat-faced grips and a 0.445 kN load cell. The gauge length was 5.08 cm and the cross-head speed was 50.8 cm/min. The sample dimensions were 2.54 cm by 15.24 cm. To ensure comparable results, the laboratory temperature was maintained between 68° F. and 72° F. to ensure comparable results. Data was discarded if the sample broke at the grip interface.

For longitudinal MTS measurements, the larger dimension of the sample was oriented in the machine, or "down web," direction. For the transverse MTS measurements, the larger dimension of the sample was oriented perpendicular to the machine direction, also known as the "cross web" direction. Each sample was weighed using a Mettler Toledo Scale Model AG204. The thickness of the samples was then measured using a Kafer FZ1000/30 snap gauge. The samples were then tested individually on the tensile tester. Three different sections of each sample were measured. The average of the three maximum load (i.e., the peak force) measurements was used.

The longitudinal and transverse MTS were calculated using the following equation:

MTS=(maximum load/cross-section area)*(bulk density of PTFE)/density of the porous membrane), wherein the bulk density of PTFE is taken to be 2.2 g/cc.

The average of three cross-web measurements was recorded as the longitudinal and transverse MTS.

Density

To calculate density, measurements from the Matrix Tensile Testing were used. As mentioned above, the sample dimensions were 2.54 cm by 15.24 cm. Each sample was weighed using a Mettler Toledo Scale Model AG204 and then the thickness of the samples was taken using a Kafer FZ1000/30 snap gauge. Using this data, a density of the sample can be calculated with the following formula:

ρ=m/w*l*t where: ρ=density (glee)
m=mass (g)
w=width (1.5 cm)
l=length (16.5 cm)
t=thickness (cm)

The reported results are the average of 6 calculations.

Gurley Air Flow

The Gurley air flow test measures the time in seconds for 100 cm$^3$ of air to flow through a 6.45 cm$^2$ sample at 12.4 cm of water pressure. The samples were measured in a Gurley Densometer Model 4340 Automatic Densometer. When multiple tests are performed on the same sample, care must be taken to ensure that the edges of the test areas do not overlap. (The compression that occurs to the material along the edges of the test area when it is clamped to create a seal during a Gurley test can affect the air flow results.) The reported results are the average of three measurements.

Moisture Vapor Transmission Rate Test—(MVTR)

The MVTR for each sample was determined in accordance with the general teachings of ISO 15496 except that the sample water vapor transmission (WVP) was converted into MVTR moisture vapor transmission rate (MVTR) based on the apparatus water vapor transmission (WVPapp) and using the following conversion.

MVTR=(Delta $P$ value*24)/((1/WVP)+(1+WVPapp value))

To ensure comparable results, the specimens were conditioned at 73.4±0.4° F. and 50±2% rH for 2 hrs prior to testing and the bath water was a constant 73.4° F.±0.4° F.

The MVTR for each sample was measured once, and the results are reported as g/m$^2$/24 hours.

Water Leakage Resistance

A modified Suter Tester was used to determine the resistance to leakage for each of the oleophobically-treated membranes. The samples were challenged with deionized water. This water was forced against a sample area of about 4¼ inch (10.8 cm) diameter sealed by a rubber gasket in a clamped arrangement. A clean, dry paper towel was placed on top of the test material, between the membrane and the clear clamping head, to highlight any leakage of deionized water through the membrane during the test. A clamp with clear polycarbonate disk restraint was used to keep the edges of the sample sealed, and allow for good visibility to the sample for leakage during the test.

To initiate the test, the pressure was slowly ramped to 1.5 bar (at a rate of approximately 0.1 bar/sec). Once at 1.5 bar, it was held for 5 minutes. After 5 minutes, the pressure was ramped to 2.5 bar, and held for 10 seconds. If the test sample leaks at any point, the test is stopped, and the result for the sample is considered a Fail. For a failed test sample, the pressure at which the sample leaked is noted. If the sample does not leak during this test, than the result for the sample is considered a Pass. The reported data for Water Leakage Resistance is the result of a single measurement.

Mass/Area

In order to measure mass per area, samples were prepared using a Karl Schroder 100 cm$^2$ circle cutter. Each sample was weighed using a Mettler Toledo Scale Model AB204. The scale was recalibrated prior to weighing specimens, and the results were reported in grams per square meter (gsm). For membrane samples, the reported results are the average of three measurements. For printed laminate samples, the reported data is the result of a single measurement.

Oil Rating Test

Oil rating of both membranes and laminates were measured. Tests were conducted following the general teachings of AATCC Test Method 118-1997. The oil rating number is the highest number oil which does not wet the material within a test exposure time of 30±2 seconds. The reported results are the average of three measurements.

SEM Sample Preparation Method

Cross-section SEM samples were prepared by spraying them with liquid nitrogen and then cutting the sprayed samples with a diamond knife in a Leica ultracut UCT, available from Leica Microsystems, Wetzlar, Germany.

Fibril Length Measurements

The surface SEM images were used to measure Fibril Length. A magnification was chosen to enable the viewing of multiple fibrils, including a clear view of the points where fibrils attached to nodes. The same magnification was used for each sample that was measured. Since these node and fibril structures were irregular, 15 different fibrils, randomly distributed across each image, were identified for measurement.

To measure each fibril accurately, lines were drawn with the cursor so that they were perpendicular to the fibril on both ends where the fibril attaches to the node. The distance between the cursor drawn lines were measured, and recorded for each fibril. The results for each surface image of each sample were averaged. The reported value for Fibril Length represents the average of 15 sample measurements on the SEM image.

Liquidproof Test (Suter)

Liquidproof testing was conducted as follows. Laminates were tested for liquidproofness by using a modified Suter test apparatus with water serving as a representative test liquid. Water is forced against a sample area of about 4¼ inch (10.8 cm) diameter sealed by two rubber gaskets in a clamped arrangement. Samples are tested by orienting the sample so that the outer film surface of the sample is the surface against which water is forced. The water pressure on the sample is increased to about 1 psi (6.9 KPa) by a pump connected to a water reservoir, as indicated by an appropriate gauge and regulated by an in-line valve. The test sample was positioned at an angle, and the water was recirculated to ensure that water, not air, contacted the lower surface of the sample. The surface opposite the outer film surface of the sample was observed for a period of 3 minutes for the appearance of any water which would be forced through the sample. Liquid water seen on the surface was interpreted as a leak.

A passing (liquidproof) grade was given in cases where no liquid water is visible on the sample surface within 3 minutes. A sample was deemed "liquidproof" as used herein if it passed this test. Samples having any visible liquid water leakage, e.g. in the form of weeping, pin hole leak. etc. were not considered liquidproof and failed the test.

Martindale Abrasion to Leakage

Martindale testing was used in combination with The Liquidproof Test described above to determine the durability of the printed surface. Martindale Abrasion was tested as per the general teachings of ASTM D4966, "Standard Test Method for Abrasion Resistance of Textile Fabrics (Martindale Abrasion Tester Method)" using a Martindale Abrasion test apparatus with the following modifications. A 6.25" (15.9 cm) diameter circle specimen was placed over the standard piece of felt on the testing table face up so the film surface of the sample was subjected to abrasion challenge. A wool abradant was used to challenge the printed film surface of the laminate. In this test, 16 movements or rubs make up the Lissajous repeat, per cycle. Abrasion was conducted at regular intervals of 1000 cycles, or 16,000 movements or rubs, and Liquidproof Test measurements were made at the end of each cycle interval. The reported Martindale result is the number of cycles each sample reached before failing the Liquidproof test. The reported results are the average of two measurements.

Gurley Air Flow After Abrasion

Gurley Air Flow Testing, as described above, was used in combination with an abrasion test in order to quantitatively assess the increase in porosity from fractures created in the membrane structure during abrasion. For this testing, the abrasion was performed on each sample using a Taber Abraser 5900. The H-18 abrasive material is applied directly to the printed membrane surface, with a 4.5N force and a speed of 30 cycles per minute to evaluate the inventive and comparative examples for their resistance to abrasion. The H-18 abrasive material was cleaned before the testing of each sample. Gurley air flow was measured and recorded for each sample prior to testing. This measurement will be referred to as Gurley before Abrasion.

Each sample is run for 8 cycles on the Taber Abraser. Next, Gurley air flow is measured for each sample in 3 different locations along the line in which the sample was abraded during this test. It was ensured that the abraded line was running through the center of the Gurley test area during these measurements, and that the compressed edges of the three separate sampling areas did not overlap. The reported results are an average of three measurements.

Gurley Change After Abrasion

The following calculation was made to determine Gurley Change after Abrasion, using the data recorded while performing the Gurley after Abrasion test. This data for Gurley Change after Abrasion characterizes the ability of the material to resist abrasion, and the fracturing that can occur to the printed membrane surface in these laminates when exposed to abrasion. A negative percentage as a result indicates that the material has been made more porous as a result of the abrasion test fracturing the printed membrane surface.

$$\text{Gurley Change After Abrasion} = \left( \frac{\text{Gurley after Abrasion} - \text{Gurley before Abrasion}}{\text{Gurley before Abrasion}} \right) \times 100\%$$

The reported results are the average of three measurements.

Gloss

Measurements for gloss were, taken on the printed surface at an 85° angle in the cross-web direction of the sample, using a BYK "micro-TRI-gloss µ" device. Data reported is the average of 3 individual measurements.

Color Consistency—Delta E

An L*a*b* reading of the middle of the sample was taken using an X-Rite i7 Spectrophotometer (X-Rite World Headquarters in Grand Rapids, Mich. or www.xrite.com). This set of L*, a*, and b* data were used as the initial readings for the sample. Three additional locations on the sample were tested around the initial sample location, but within a 1 inch (2.5 cm) radius. L*a*b* readings were taken for these three additional locations. These readings for L*a*b* for the three additional locations were referred to as the Second, Third, and Fourth set of L*a*b* readings, in the equations below, and were used to calculate a color change between the initial sample, and these three additional locations. To determine the color change at each additional test location, the root mean square of the difference values were calculated using the equations below. A lower value for Color Consistency indicates more consistent color.

Color change $A=((\text{Second } L^* \text{ reading} - \text{initial } L^* \text{ reading})^2 + (\text{Second } a^* \text{ reading} - \text{initial } a^* \text{ reading})^2 + (\text{Second } b^* \text{ reading} - \text{initial } b^* \text{ reading})^2)^{1/2}$ Color change $B=((\text{Third } L^* \text{ reading} - \text{initial } L^* \text{ reading})^2 + (\text{Third } a^* \text{ reading} - \text{initial } a^* \text{ reading})^2 + (\text{Third } b^* \text{ reading} - \text{initial } b^* \text{ reading})^2)^{1/2}$ Color change $C=((\text{Fourth } L^* \text{ reading} - \text{initial } L^* \text{ reading})^2 + (\text{Fourth } a^* \text{ reading} - \text{initial } a^* \text{ reading})^2 + (\text{Fourth } b^* \text{ reading} - \text{initial } b^* \text{ reading})^2)^{1/2}$ This root mean square of the color change values are in units of delta E (dE).

Color Consistency is reported for each sample as the average of these three color change measurements, using the following equation.

Color Consistency=((Color change $A$+Color change $B$+Color change $C$)/3)

Colorfastness to Light

The colorfastness to light was determined in accordance with AATCC

Test Method 16-2004, using Test Option 3 (Xenon-Arc Lamp, Continuous Light, Black Panel Option), with the following exceptions. A water cooled xenon light weatherometer model Ci4000 was used. An extended exposure time of 80 hours was used for this test. During this test, the sample was placed in a test mask, so that part of the sample remained unexposed to the light, and maintained the initial color for comparison. The color change was measured between the unexposed and exposed areas of the samples, using the following calculation.

Color change=((Exposed $L^*$ reading−Unexposed $L^*$ reading)$^2$+(Exposed $a^*$ reading−Unexposed $a^*$ reading)$^2$+(Exposed $b^*$ reading−Unexposed $b^*$ reading)$^2$)$^{1/2}$ This color change is reported as Colorfastness to Light after 80 hours exposure, in units of delta E (dE). The reported data is the result of a single test on each sample.

EXAMPLES

Example 1

A two-layer membrane was made from two different PTFE tapes in the following manner. Fine powder of PTFE polymer (PTFE 605XT X, E.I. DuPont deNemours, Wilmington, Del.) was blended with Isopar K (Exxon Mobil Corp., Fairfax, Va.) in the proportion of 0,235 g/g of fine powder. The lubricated powder was compressed in a cylinder to form a pellet and placed into an oven set at 49° C. for approximately 8 hours. The compressed and heated pellet was ram extruded to produce an extrudate tape approximately 15 cm wide by 0.75 mm thick. Hereafter, this tape is referred to as Tape 1.

Another fine powder was used to create a second tape, referred to herein as Tape 2. The tape was made the same manner as Tape 1 with the following exceptions. A PTFE polymer (Teflon PTFE 601A, E.I. DuPont deNemours, Wilmington, Del.) was used and the ratio of lubricant to fine powder was 0.218 g/g.

Tape 1 and Tape 2 were calendered together between compression rolls set to a temperature of 38° C., using a gap of 0.61 mm. The two-layer calendered tape was then transversely stretched at a ratio of approximately 3:1, and dried in an oven set at 250° C. The dry tape was longitudinally expanded 1.33:1 at a temperature of approximately 300° C. The longitudinally expanded tape was then transversely expanded at a temperature of approximately 250° C. to at a ratio of approximately 6:1, then restrained from shrinking and heated in an oven set at approximately 375° C. for approximately 15 seconds, thereby creating a 41.1 gsm two-layer composite membrane.

A fluoroacrylate coating was then applied to the membrane in order to render it oleophobic while preserving the microporous structure.

The test results obtained for the two-layer composite membrane are set forth in Table 1.

Example 2

A textile laminate was made from the membrane of Example 1 and a knit textile in the following manner. A length of 27 g/m² warp knit textile fabric was obtained (Style #A1484 Poly Knit from Glen Raven, Inc. located in Glen Raven, N.C., USA). A discontinuous adhesive dot lamination process was used to combine the membrane and knit textile. A low surface energy ink was then printed onto the membrane side of this textile laminate utilizing a gravure process.

The test results obtained for the ink-printed textile laminate are set forth in Table 2.

Example 3

A three-layer membrane was made as follows. A layer of Tape 2 as described in Example 1 was placed between one layer each of Tape 1 as described in Example 1. The three tapes were individually calendered between compression rolls, wherein the compression rolls were set to a temperature of 38° C. and a gap of 0.42 mm. The three tapes were next calendered together between compression rolls, wherein the compression rolls were set to a temperature of 38° C. and a gap of 0.61 mm.

The three-layer calendered tape was then transversely stretched at a ratio of approximately 3:1 and subsequently dried in an oven set at 250° C. The resulting dry tape was longitudinally expanded at a ratio of about 19:1 at a temperature of approximately 300° C. The longitudinally expanded tape was then transversely expanded at a temperature of approximately 250° C. at a ratio of approximately 6:1 and then restrained from shrinking and heated in an oven set at approximately 375° C. for about 15 seconds, thereby creating a 28.1 gsm three-layer membrane.

A fluoroacrylate coating was then applied to the membrane in order to render it oleophobic while preserving the microporous structure.

The test results obtained for the three-layer composite membrane are set forth in Table 1.

Example 4

A textile laminate was made from the three-layer membrane of Example 3 and a knit textile in the following manner. A length of 27 g/m² warp knit textile fabric was obtained (Style #A1484 Poly Knit from Glen Raven, Inc. located in Glen Raven, N.C., USA). A discontinuous adhesive dot lamination process was used to combine the membrane and knit textile. A low surface energy ink was then printed onto the membrane side of this textile laminate utilizing a gravure process.

The test results obtained for the ink printed textile laminate are set forth in Table 2.

Comparative Example 1

A one-layer membrane was made as follows. Tape 1 as described in Example 1 was calendered between compression rolls set to a temperature of 38° C. at a gap of 0.61 mm.

The calendered tape was then transversely stretched at a ratio of approximately 3:1 and subsequently dried in an oven set at 250° C. The resulting dry tape was longitudinally expanded at a ratio of about 1.9:1 at a temperature of approximately 300° C. The longitudinally expanded tape was then transversely expanded at a temperature of approximately 250° C. at a ratio of approximately 6:1, then restrained from shrinking and heated in an oven set at approximately 375° C. for about 15 seconds, thereby creating a 27.7 gsm single-layer membrane.

A fluoroacrylate coating was then applied to the membrane in order to render it oleophobic while preserving the microporous structure.

The test results obtained for the single-layer membrane are set forth in Table 1.

Comparative Example 2

Fine powder of PTFE polymer as described and taught in U.S. Pat. No. 6,541,589 comprising perfluorobutylethylene modifier was blended with Isopar K (Exxon Mobil Corp., Fairfax, Va.) in the proportion of 0.242 g/g of fine powder. The lubricated powder was compressed in a cylinder to form a pellet and placed into an oven set at 49° C. for approximately 8 hours. The compressed and heated pellet was ram extruded to produce an extrudate tape approximately 15 cm wide by 0.75 mm thick.

A membrane was made by calendaring the extrudate tape between compression rolls set to a temperature of 38° C. at a gap of 0.61 mm. The calendered tape was then transversely stretched at a ratio of approximately 3:1 and subsequently dried in an oven set at 250° C. The resulting dry tape was longitudinally expanded at a ratio of about 1.9:1, at a temperature of approximately 300° C. The longitudinally expanded tape was then transversely expanded at a temperature of approximately 250° C. at a ratio of approximately 6:1, then restrained from shrinking and heated in an oven set at approximately 375° C. for about 15 seconds, thereby creating a 25.0 gsm single-layer membrane.

A fluoroacrylate coating was then applied to the membrane in order to render it oleophobic while preserving the microporous structure.

The test results obtained for the single-layer membrane are set forth in Table 1.

TABLE 1

| Membrane Properties | Example 1 | Example 3 | Comparative Example 1 | Comparative Example 2 |
|---|---|---|---|---|
| Density (g/cc) | 0.41 | 0.42 | 0.40 | 0.59 |
| Thickness (μm) | 70 | 47 | 57 | 34 |
| Longitudinal MTS (MPa) | 30.1 | 33.9 | 19.1 | 44.7 |
| Transverse MTS (MPa) | 76.4 | 78.0 | 70.8 | 187.0 |
| Gurley Number (sec) | 33.5 | 20.8 | 5.0 | 27.5 |
| MVTR (g/m$^2$/24 hours) | 60,190 | 65,268 | 71,083 | 62,186 |
| Water Leakage Resistance | Pass | Pass | Fail (leaked at 0.25 bar) | Pass |
| Mass/Area (g/m$^2$) | 41.1 | 28.1 | 27.7 | 25.0 |
| Oil Rating | 6 | 4.7 | 6 | 4 |
| Average Fibril Length outer membrane (μm) | 7.1 | 4.4 | 6.4 | 2.1 |
| Average Fibril Length inner membrane (μm) | 2.7 | 5.1 | 6.1 | 1.6 |

TABLE 2

| Textile Laminate Properties | Example 2 | Example 4 | Comparative Example 1 | Comparative Example 2 |
|---|---|---|---|---|
| Thickness (μm) | 192 | 173 | 176 | 168 |
| Martindale Abrasion to Leakage (cycles) | 10,000 | Not Available | 1,000 | Not Available |
| Gurley Number (sec) | 35.6 | 42.3 | 14.1 | 505.0 |
| Gurley after Abrasion (sec) | 34.3 | 18.1 | 8 | 1 |
| Gurley Change after Abrasion (%) | −4% | −57% | −43% | −100% |
| MVTR (g/m$^2$/24 hours) | 29,422 | 31,072 | 34,543 | 12,585 |
| Mass/Area (g/m$^2$) | 80.1 | 66.9 | 66.5 | 69.4 |
| Gloss (gloss units) | 7.7 | 8.3 | 6.8 | 12.5 |
| Color Consistency (dE) | 0.723 | 0.661 | 1.738 | 1,762 |
| Oil rating (printed surface) | 6 | 5 | 5 | 4 |
| Colorfastness to Light (dE) | 0.83 | 0.56 | 0.26 | 1.47 |

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A hydrophobic asymmetric porous membrane comprising:
   a first expanded polytetrafluoroethylene membrane having a first microstructure and containing a plurality of pores having a first pore size; and
   a second expanded polytetrafluoroethylene membrane having second microstructure and containing a plurality of pores having a second pore size,
   wherein said first pore size is greater than said second pore size,
   wherein at least one of said first expanded polytetrafluoroethylene membrane and said second expanded polytetrafluoroethylene has printed area on exterior surface thereof, said printed area comprising a colorant coating composition including pigment having a particle size sufficiently small to fit within the pores of the asymmetric porous membrane, and
   wherein said printed area has a gloss less than 10 gloss units.

2. The asymmetric porous membrane of claim 1, further comprising a third expanded polytetrafluoroethylene membrane having a third microstructure positioned on said second membrane such that said second membrane is sandwiched between said first membrane and said third membrane.

3. The asymmetric porous membrane of claim 2, wherein said third microstructure is substantially the same as said first microstructure.

4. The asymmetric porous membrane of claim 2, wherein said third membrane contains a plurality of pores having a third pore size that is greater than said second pore size, and wherein said first microstructure is different from said second microstructure.

5. The asymmetric porous membrane of claim 1, wherein said asymmetric membrane has an oil rating greater than about 6.

6. The asymmetric porous membrane of claim 1, wherein said asymmetric membrane has a moisture vapor transmission rate greater than about 60000 g/m2/24 hours.

7. The asymmetric porous membrane of claim 1, wherein printed area has a gloss less than 8 gloss units.

8. The asymmetric porous membrane of claim 1, wherein said printed area has a color consistency less than about 1.5 delta-E.

9. The asymmetric porous membrane of claim 1, wherein said printed area has a color consistency less than about 1.0 delta-E.

10. The asymmetric porous membrane of claim 1, said printed area has a color consistency less than about 0.8 delta-E.

\* \* \* \* \*